April 20, 1937.  J. SCHAUB  2,077,644

WORKING AND COMPRESSING APPARATUS

Filed July 9, 1932   4 Sheets-Sheet 1

INVENTOR
Jacob Schaub
BY
Paul R. Ames
ATTORNEY

April 20, 1937. J. SCHAUB 2,077,644
WORKING AND COMPRESSING APPARATUS
Filed July 9, 1932 4 Sheets-Sheet 2
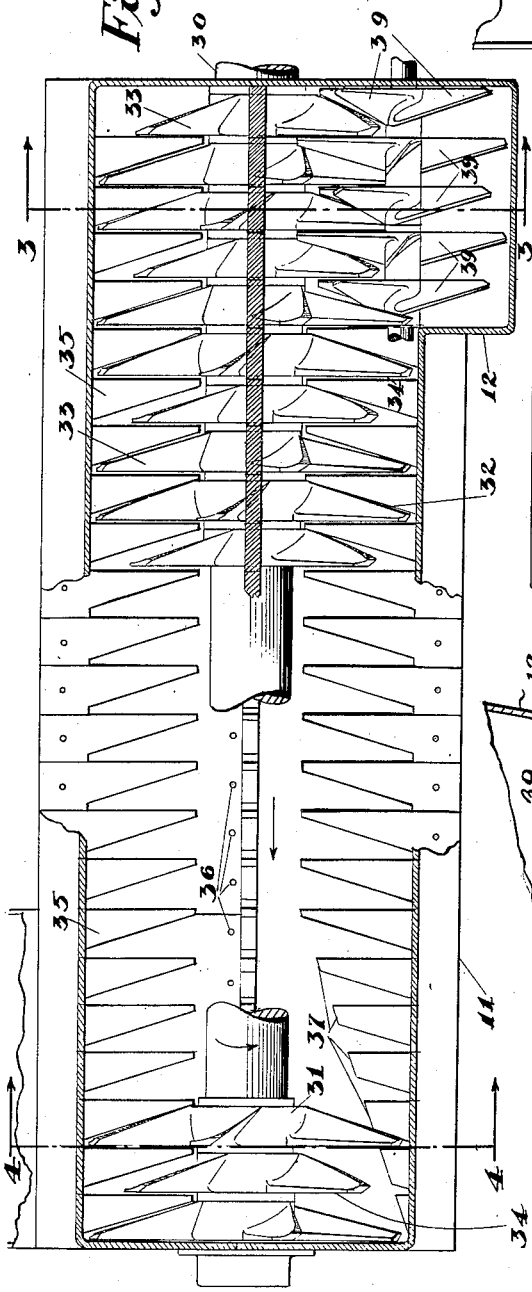
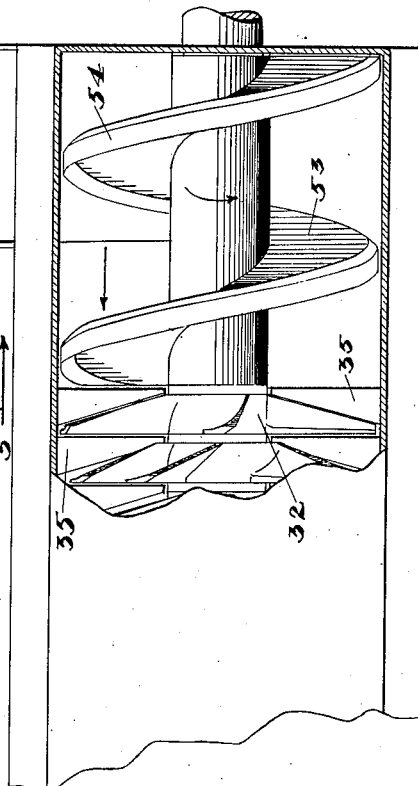
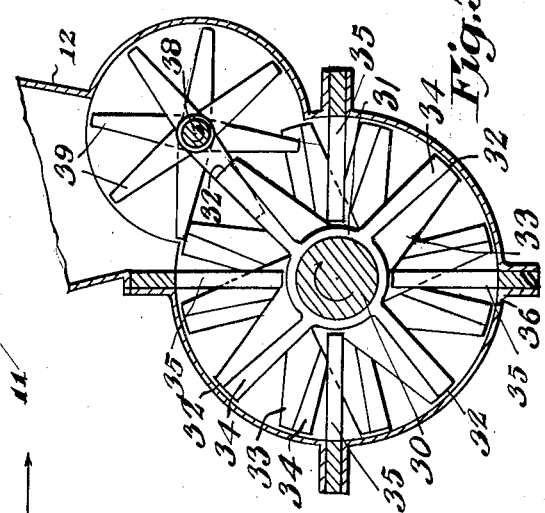
INVENTOR
Jacob Schaub
BY Paul R. Ames
ATTORNEY April 20, 1937.  J. SCHAUB  2,077,644

WORKING AND COMPRESSING APPARATUS

Filed July 9, 1932   4 Sheets-Sheet 3

INVENTOR
Jacob Schaub
BY
Paul R. Ames
ATTORNEY

April 20, 1937.  J. SCHAUB  2,077,644
WORKING AND COMPRESSING APPARATUS
Filed July 9, 1932   4 Sheets-Sheet 4
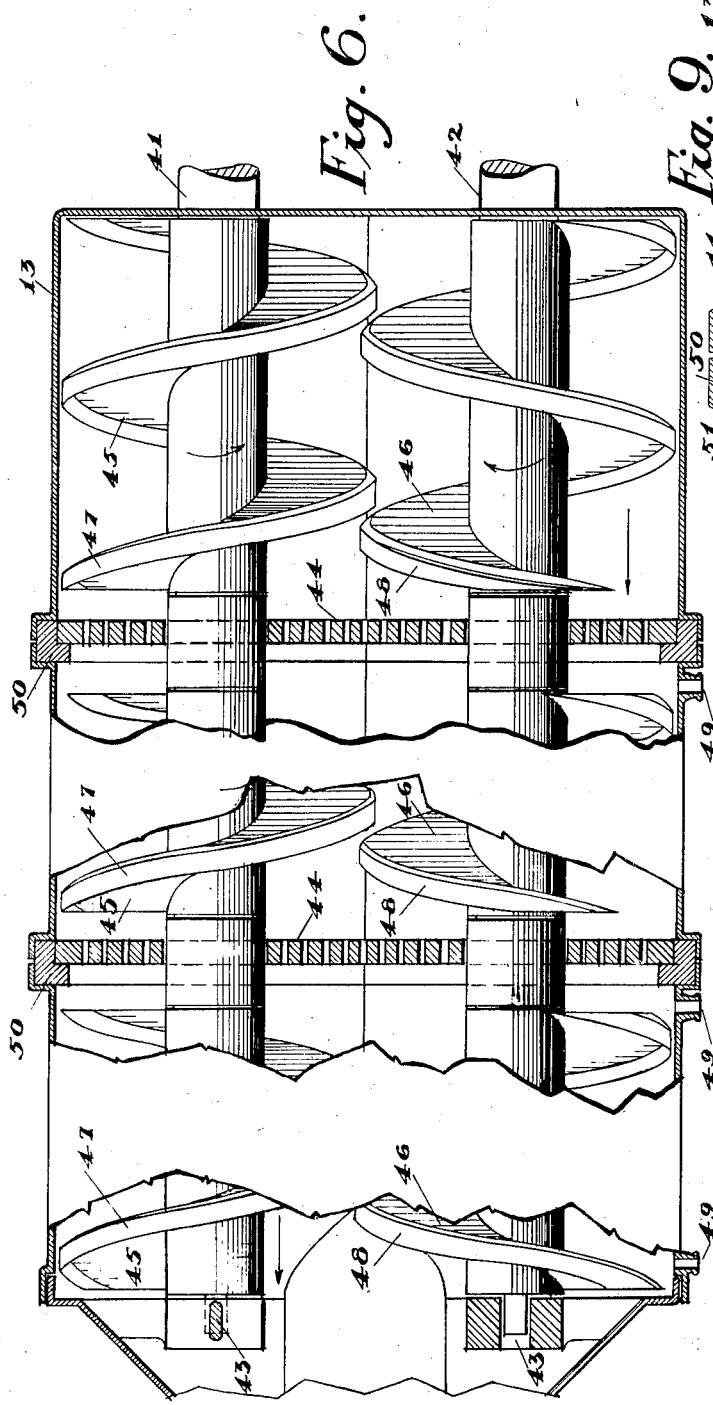
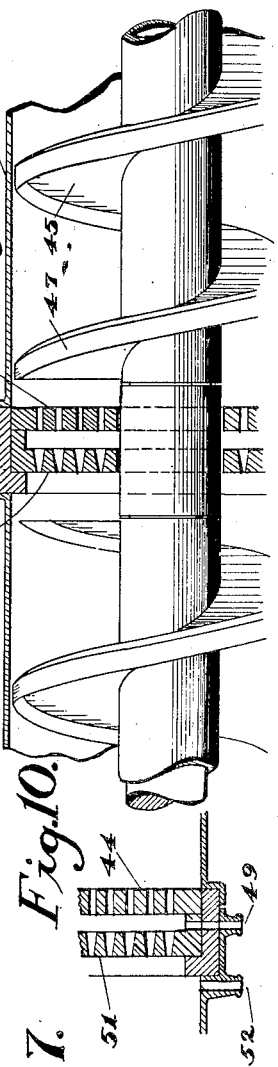
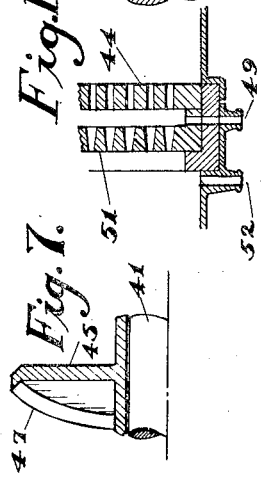
INVENTOR
Jacob Schaub
BY
Paul R. Ames
ATTORNEY Patented Apr. 20, 1937

2,077,644

UNITED STATES PATENT OFFICE 2,077,644

WORKING AND COMPRESSING APPARATUS

Jacob Schaub, Westfield, N. J., assignor to The Best Foods, Inc., New York, N. Y., a corporation of Delaware Application July 9, 1932, Serial No. 621,651

10 Claims. (Cl. 31—37)

This invention relates to a method and apparatus for preparing butter-like products and particularly to an apparatus for working, kneading and seasoning the crystallized oil and milk particles produced in the preparation of margarine. The apparatus is particularly adapted to the treatment of the chilled crystals of oil and milk emulsion immediately after they are removed from the chilling bath and thereby making it possible to avoid the tempering step usually followed in the preparation of margarine.

It is an object of the invention to provide an improved method and apparatus for working and kneading the crystals, for expressing the excess water from the mass and for applying and mixing measured quantities of salt and milk with the product. Other objects will become apparent.

In describing the invention reference will be made to the drawings in which:

Figure 2 is a plan view of the worker with the top portion of the casing removed, with a portion of the shaft and casing broken away and with some of the blades removed from the shaft;

Figure 3 is a section taken on the line 3—3 of Figure 2;

Figure 5 is a fractional plan view of the inlet end of a slightly modified form of a worker similar to that shown in Figure 2;

Figure 6 is a side elevation, partly broken away, of the interior of a machine for compressing the mass to express water from it, the casing and plates being shown in section;

Figure 7 is a detailed fractional cross-section of a portion of the screw conveyor shown in Figure 6;

Figure 9 is a fractional elevation of the upper portion of the interior of an apparatus similar to that shown in Figure 6, the plates and casing being shown in section; and Figure 10 is a fractional section through the lower portion of the plates and casing of the apparatus shown in Figure 9.

Figure 1:
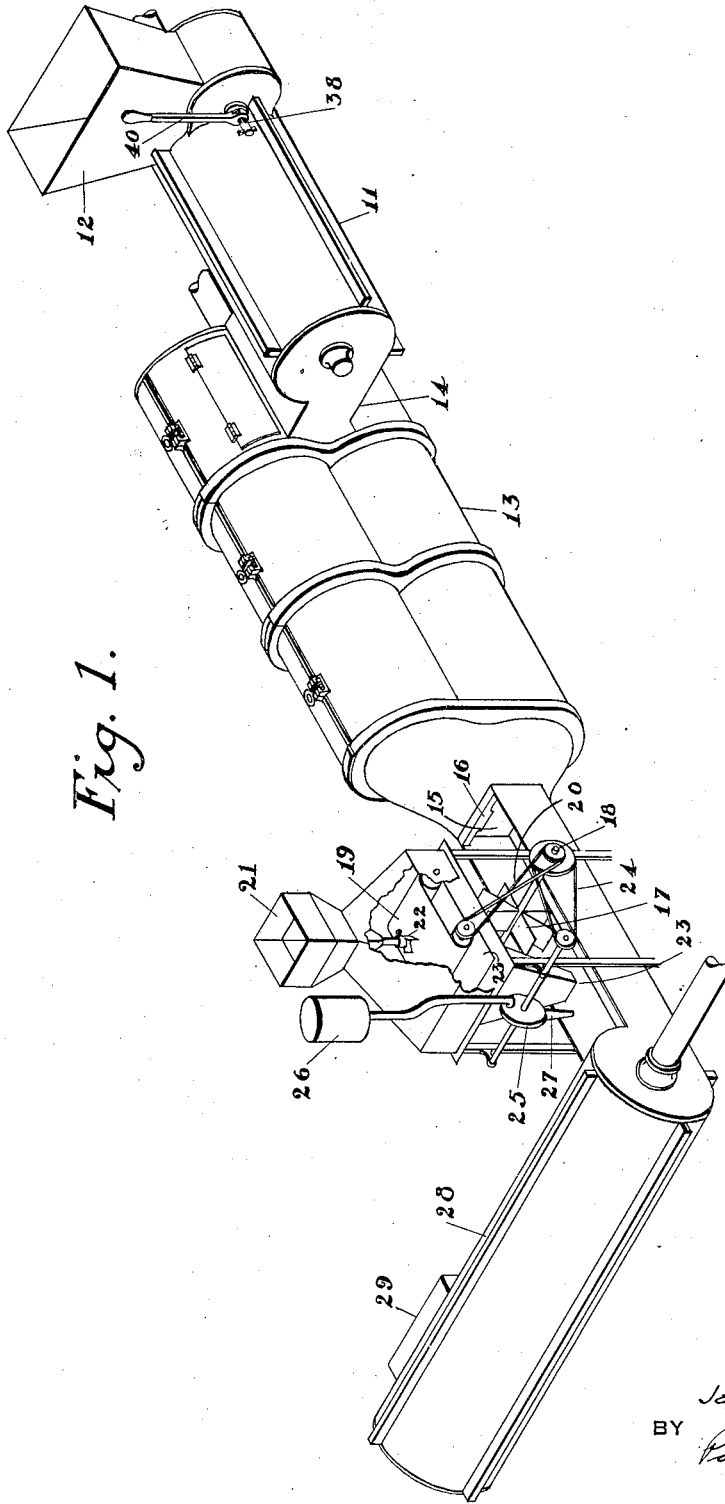
Figure 1 is a view in perspective of a portion of the improved apparatus with a portion of the salting unit broken away.

In describing the apparatus reference will be made to the drawings in which numeral 11 indicates my improved worker, with a hopper 12 through which the oil-milk emulsion crystals are received from a chilling bath such, for example, as that described in my copending application Serial No. 621,652, filed July 9, 1932, entitled "Apparatus for preparing butter substitutes". The worker 11 communicates with a further working and compressing apparatus 13 through a conduit 14 leading from the side of the worker 11 into the side of the compressor 13. The mass is advanced through the compressor and extruded through an opening 15 having a template 16 shaped to form a depression in the top surface of the extruded block or print. As the print is pushed forwardly from the opening 15, it passes under and contacts with the paddles 17, so that the forward movement of the print rotates the shaft 18, which shaft drives an endless belt 19 through the belt or chain 20. Salt is supplied to a hopper 21 having an outlet tube with a sleeve 22 which is adjustable to regulate the height of the pile of salt upon the belt 19. From the end of the belt 19 the salt falls into a funnel-shaped tube 23 which conveys it into the depression formed in the top of the print by the template 16. A chain or belt 24, also driven from the shaft 18 upon rotation of the paddle wheel 17, rotates the impellers in a liquid measuring pump 25 to pump a measured quantity of milk from a container 26 and discharges it through the pump outlet 27.

With this arrangement the forward movement of the print regulates the rate of feed of the salt to the groove in the print and the rate of delivery of milk to the pile of salt. The quantity of salt and milk delivered per volume of material passing through the machine may be regulated by the sleeve 22 and by regulating the speed of the liquid measuring pump or by other well known means. No claim is made in the present application to this apparatus, which is the subject-matter of copending application Serial No. 621,653, filed July 9, 1932, now Patent No. 2,020,435, dated Nov. 12, 1935.

After passing through the salting unit the print is forced into a second worker 28, which may be similar to the worker 11, and the finished product is discharged through the outlet 29, after which it may be packaged in any well known manner.

Figure 4:
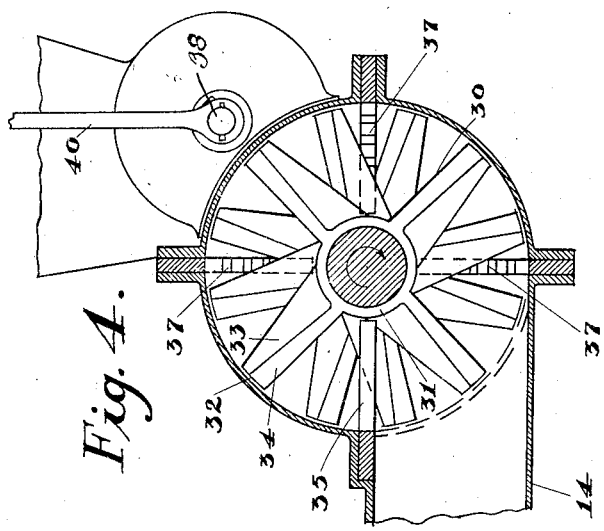
Figure 4 is a section taken on the line 4—4 of Figure 2.

Referring now to the construction of the worker 11, this worker is provided with a shaft 30, supported in suitable bearings, which shaft may be driven in any usual manner, for instance, through suitable gearing from an electric or other motor (not shown). As illustrated in Figures 2, 3 and 4, this shaft 30 carries a series of propellers 31, each of which is provided with four blades 32. These propellers may be positioned upon the shaft 30 as illustrated in the drawings and so that the corresponding blades 32 of succeeding propellers lie in helical paths, and may be held in position, for example, by suitable keys and keyways in the shaft and collars; by suitably positioned lugs and slots in the opposite side of each collar; or simply by the compression of a nut at one end of the shaft bearing against the end collar, the collar at the opposite end of the shaft being held by a shoulder on the shaft, or by any other suitable manner.

These blades 32, include an advancing surface 33, which slants forwardly from its leading edge, and a vertically disposed cutting surface 34. As the collars rotate with the shaft 30, the blades 32 pass between four sets of teeth 35, which are shown in Figure 3 as extending inwardly from four points of the casing of the machine. The outer ends of these teeth may be held between the sections of the casing 11 by bolts passing through the teeth and flanges in the casing or by other suitable clamping means. Drain holes 36 are provided in the bottom of the casing 11 just beyond or behind the row of teeth at the bottom of the casing.

At the outlet end of the worker 11 the teeth 35 are cut off as indicated at 37 on each of the sets of teeth except the one above the outlet 14 (see Figures 2 and 4) for the purpose hereinafter described.

A shaft 38 is provided at the inlet end of the worker under the hopper 12. This shaft carries a group of blades 39 fixed to collars which rotate with the shaft 38 and pass between the blades 32, 32. The shaft 38 may be provided with a hand operated ratchet 40 for rotating the shaft to prevent the material being fed into the hopper 12 from bridging over the blades 32, or this shaft 38 may, if desired, be provided with a motor for rotating it continuously, but I have found that the rotation of the blades 32 will rotate the blades 39 by the friction of the material being fed through the machine, so that in ordinary use in the manufacture of butter substitutes such a drive is unnecessary. Also it is sometimes advantageous to operate this feed intermittently in order to better control the quantity of material passing through the worker. The casing of the worker 11 may be opened up so that access may be had to the interior thereof for the purpose of cleaning and repairing the kneader when necessary.

In operating the worker 11 the shaft 30 is rotated, as indicated in the drawings, so that the blades move in a clockwise direction, as viewed in Figures 3 and 4, and the crystals of the milk-oil emulsion, which may be produced as described in my aforesaid copending application Serial No. 621,652 are fed directly from the crystallizer into the hopper 12. Each slanting surface 33 of the blades advances a portion of the mass of crystals a short distance over the adjacent tooth 35 and compresses it against the near surface of such tooth. As the rotation continues this mass of material is sheared or cut between the vertical cutting surface 34 of each blade and the adjacent vertical edge of the corresponding tooth 35. By this action the material builds up on the near surfaces of the teeth 35 and will be separated from the far surfaces. The drain holes 36, which are positioned close to the far side of each of the lower set of teeth where the material is under reduced pressure, permit any water expressed by the compression to flow out of the casing, after which it may be disposed of as desired. This compressing and cutting action is repeated as the material is slowly advanced through the machine, the number of repetitions depending upon the number of blades and teeth.

When the material reaches the outlet end of the machine the pressure and cutting action are gradually reduced, because of the teeth being cut off as illustrated at 37, at each of the sets of teeth except the ones positioned over the outlet 14, which outlet is shown as located in the lower quadrant of the casing. The resistance of the remaining full set of teeth causes the material to be discharged in a solid mass through the conduit 14 into the compressor 13.

Figure 8:
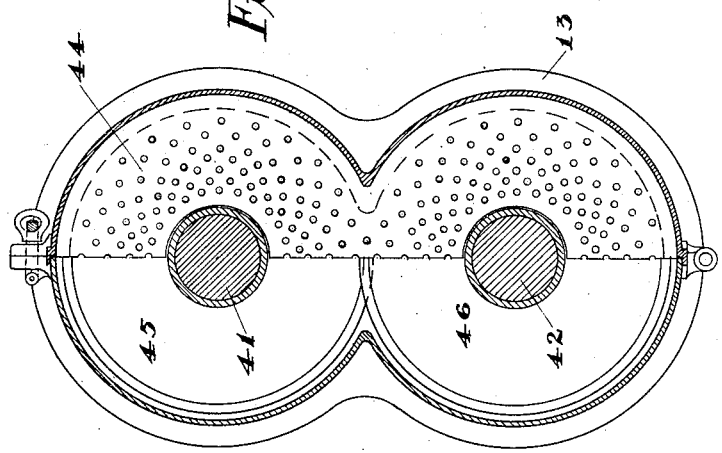
Figure 8 is a vertical sectional view through the compressor shown in Figure 6, one half being through the perforated plates and the other half through the screw conveyors.

The compressor 13 which is shown in detail in Figures 6, 7 and 8 is made up of a shaft 41 and a shaft 42 supported at one end in suitable bearings 43 and at the other end in suitable bearings outside of the casing (not shown). These shafts pass through perforated plates 44, which are retained in frames positioned at spaced points along the length of the compressor. A plurality of helical screw conveyors 45 and 46 are fixed to the shafts 41 and 42, respectively, and are positioned to extend from a short distance behind each plate to a short distance in front of the succeeding plate, thus leaving an open space in front of and behind each plate. The shafts are preferably positioned so that the screws overlap a little and the helical screws are provided with cutting rims 47 and 48 which serve to scrape the surface of the casing 13. Drain outlets 49 are provided in the bottom of the casing at the rear side of each perforated plate where the material is under reduced pressure. The plates 44 may slide along the shafts 41 and 42 and are held in place against the collars 50 by the pressure of the mass being advanced through the perforations.

In operating the compressor the mass from the worker 11 is discharged from the conduit 14 at a position between the first set of screws 45 and 46. The shafts 41 and 42 are rotated, by any suitable means, (not shown) in opposite directions and since the pitch of the two screws is opposite, they will advance the mass toward the first perforated plate 44. The mass will be compressed against the forward surfaces of the plate and will be forced through the perforations. As the material passes through the perforations and into the space behind the plate, the pressure upon it will be released and the water will separate from the mass. The water expressed in this manner will run off through the drain pipe 49.

A modified form of compressor is shown in Figures 9 and 10 where a second plate 51 is positioned behind each plate 44 and is spaced a short distance from it. The holes in the plate 51 are larger than the holes in the plate 44 and are flared at their entrances in order to accommodate any slight sagging of the material extruded through the holes in plate 44. The second perforated plate 51 acts as a stripper plate to strip off any water on the surface of the material extruded through the perforations in the plate 44 as it passes through the holes in the plate 51. This water will flow out through the outlets 49. An additional drain outlet 52 is provided after the second plate so that any water released as the material leaves that plate may be withdrawn.

The casing 13 may be hinged at the bottom and clamped at the top, as shown in Figure 8, so that the side of the casing away from the conduit 14 may be opened up to permit easy access to the inside of the machine for cleaning and inspection when necessary.

The material is forced out of the compressor through a constricted portion of the casing and the opening 15, and the required salt and any milk necessary to make up for that expressed with the water, may be added in the salt unit.

The print then passes through the second worker 28 which is similar to the worker 11. This machine may be of the construction shown in Figure 5 in which a helical screw 53 having a cutting edge 54 may be positioned opposite the point of entrance of the material so that the material entering through the side of the casing may be advanced to the blades and teeth 32 and 35, respectively.

The worker 28 serves to thoroughly mix the added milk and salt into the butter-like material and since the material is considerably warmer and softer than the crystals in the worker 11, it is in some cases, necessary to use only two sets of teeth 35, at opposite sides of the casing. The teeth opposite the outlet 29 may be cut off as at 37 and the teeth above the outlet 29 may be left as shown in Figure 2, to force the thoroughly worked, mixed and kneaded mass out of the machine. The four or more sets of teeth may, of course, be used where necessary.

In describing the invention I have referred to a particular apparatus and mode of operation but it is not intended to limit the invention to the particular arrangement shown and described, it being apparent that many modifications may be made in these features. For example, the number and shape of the blades and teeth in the workers may be varied and the means for supporting and driving the actuating surfaces may be altered to meet the desired conditions. The material being treated may be introduced into or removed from the workers and compressor in other ways and at other positions in the casing. The shapes of the casings, the means for holding the blades, teeth plates, etc. in place, and the means for removing the water, may be varied and rearranged to meet particular conditions. The teeth 35, instead of being fixed as described, may be supported at other positions in the casing or they may be mounted to move in a direction opposite to the direction of the blades 32, or in the same direction at a different speed. With such an arrangement, the teeth could be shaped to retard the mass and give greater compression or to advance the mass and reduce the compression. Also, instead of using rotating blades each with an advancing and a cutting surface, one blade may have an advancing surface and a succeeding blade may have a cutting surface.

In describing the compressor, I have illustrated only two sets of perforated plates 44. The number of plates and the number and sizes of the holes may, of course, be increased or decreased to give the desired degree of compression and expansion.

This invention is particularly adapted for use with crystals which are formed by passing a finely divided oil and milk emulsion such as is generally used in the production of margarine into a chilling bath at such a rate that the particles leaving the vat are sufficiently cooled to take a definite crystalline structure but are semi-solid within the outer crust. The conditions of chilling should preferably be such that the formation of a solid crystal is avoided and such that the inside of the particle will not remain liquid, though it is not intended to restrict the present invention to use with such crystals. No claim is made in this application to the worker which is the subject matter of my copending application Serial No. 756,236, filed December 6, 1934.

The terms used in describing and claiming the invention are used in their descriptive sense and not as terms of limitation and it is intended to include within the scope of appended claims all equivalents of the terms used and the constructions or operations described. The terms blades and teeth may, for example, refer to devices of the same construction and are not intended to limit the invention to the particular arrangement or configurations shown and described.

What I claim is:

1. An apparatus for expressing the water from plastic material comprising a plurality of perforated plates within a substantially horizontal casing, a screw conveyor for advancing the material to and through each such plate, each of said conveyors being spaced from the preceding plate, and means for draining off liquid at a point beyond each such plate.

2. A method for expressing a liquid from a plastic mass comprising repeatedly forcing the mass under pressure through constrictions in an imperforate casing, expanding the compressed material as it emerges from said constrictions, and draining off the water while so expanded and before forcing it toward the next constriction.

3. In an apparatus of the class described, the combination of a worker having blades with surfaces adapted to advance and shear a plastic material, a casing, a perforated plate in said casing, a compressor adapted to extrude the material discharged from the worker through the said perforated plate, and outlets positioned in the casing beyond the said plate for withdrawing liquid separated by the extrusion.

4. A method for removing water from a plastic emulsion containing the same, comprising repeatedly forcing the plastic emulsion through constrictions within an imperforate casing, releasing the pressure beyond each said constriction to liberate water agglomerated by said pressure, and withdrawing the water so liberated while the pressure is released and before forcing the material toward the next constriction.

5. In a device of the class described, an imperforate casing, a perforated plate extending across said casing, means for advancing the material in the casing on each side of said perforated plate, said means being spaced from the perforated plate beyond the latter, and a water outlet in the space between the perforated plate and the advancing means beyond the perforated plate.

6. In a device of the class described, a casing, a perforated plate extending across the interior of said casing, shafts extending through said perforated plate, helical blades on said shafts positioned so that the convolutions of one are slightly in advance of those of the other and so that the blades overlap, and a liquid outlet hole in the casing between the perforated plate and the casing outlet.

7. In a device of the class described, a substantially horizontal imperforate casing, a plurality of spaced perforated plates extending across the interior of said casing, conveyors positioned on each side of said plates, the conveyors on the low pressure sides of said plates being spaced from the plates, and liquid outlets through the casing in the spaces on the low pressure sides of the plates.

8. In a device of the class described, a casing, a plurality of closely spaced perforated plates extending across the interior of said casing, the holes of each succeeding plate being enlarged as compared with the holes of the preceding plate and adapted to receive the vermicular extrusions from the preceding perforated plate and to strip the liquid therefrom, means for forcing the material through the perforations in the plates, and liquid outlets in the said casing positioned beyond each such plate.

9. A device for treating plastic material comprising a casing having a compression section formed with imperforate walls, another section for permitting expansion of said material, means between said sections forming openings, means for forcing material through said compression section and said openings and into said expansion section, a liquid outlet located in said expansion section, and means for continuously moving the material away from said expansion section to prevent back-pressure.

10. An apparatus for expressing the water from plastic material comprising a substantially horizontal imperforate casing, a perforated plate in said casing, means for advancing the plastic material toward and through the perforated plate in the said casing, means for draining off liquid at a point close to and beyond said plate, and a template through which the material is extruded, said template being adapted to form groove in the top of the extruded material.

JACOB SCHAUB.